(12) United States Patent
Carraro et al.

(10) Patent No.: US 6,315,406 B1
(45) Date of Patent: Nov. 13, 2001

(54) WIRE-FRAME SPECTACLES WITH ELASTICALLY AND TEMPORARILY DEFORMABLE LOOP PORTIONS

(75) Inventors: Mirco Carraro; Roberto Carlon, both of Venice (IT)

(73) Assignee: Sinthesys S.r.L., Venice (IT)

( * ) Notice: Subject to any disclaimer, the term of this patent is extended or adjusted under 35 U.S.C. 154(b) by 0 days.

(21) Appl. No.: 09/206,591

(22) Filed: Dec. 7, 1998

(30) Foreign Application Priority Data

Dec. 12, 1997 (EP) .................................................. 97830668

(51) Int. Cl.⁷ ....................................................... G02C 1/00
(52) U.S. Cl. ................................ 351/86; 351/83; 351/138
(58) Field of Search .................................... 351/106, 103, 351/83, 86, 41, 158, 136, 138, 137

(56) References Cited

U.S. PATENT DOCUMENTS

| 625,083 | 5/1899 | Belt . |
| 5,073,020 | 12/1991 | Lindberg et al. . |
| 5,135,296 | 8/1992 | Lindberg et al. . |
| 5,523,806 | 6/1996 | Sakai . |

FOREIGN PATENT DOCUMENTS

| 762178 | 3/1997 | (EP) . |
| 334273 | 7/1903 | (FR) . |
| WO95/18986 | 7/1995 | (WO) . |
| WO96/30799 | 10/1996 | (WO) . |
| 97/23802 | * 7/1997 | (WO) . |
| WO97/23803 | 7/1997 | (WO) . |

* cited by examiner

Primary Examiner—Hung Xuan Dang
(74) Attorney, Agent, or Firm—Fay, Sharpe, Fagan, Minnich & McKee, LLP

(57) ABSTRACT

The invention relates to spectacles with a wire frame where the frame has a mounting structure for the lenses and two sidepieces connected to the mounting structure by a hinge portion. According to the invention, the mounting structure of the two lenses has loops made in it, each loop being elastically deformable in such a way that it can elastically and temporarily vary the amplitude of the area enclosed by the mounting perimeter of the frame relative to the corresponding edge of the lens so as to facilitate the fitting of the lenses in the frame rims.

25 Claims, 5 Drawing Sheets

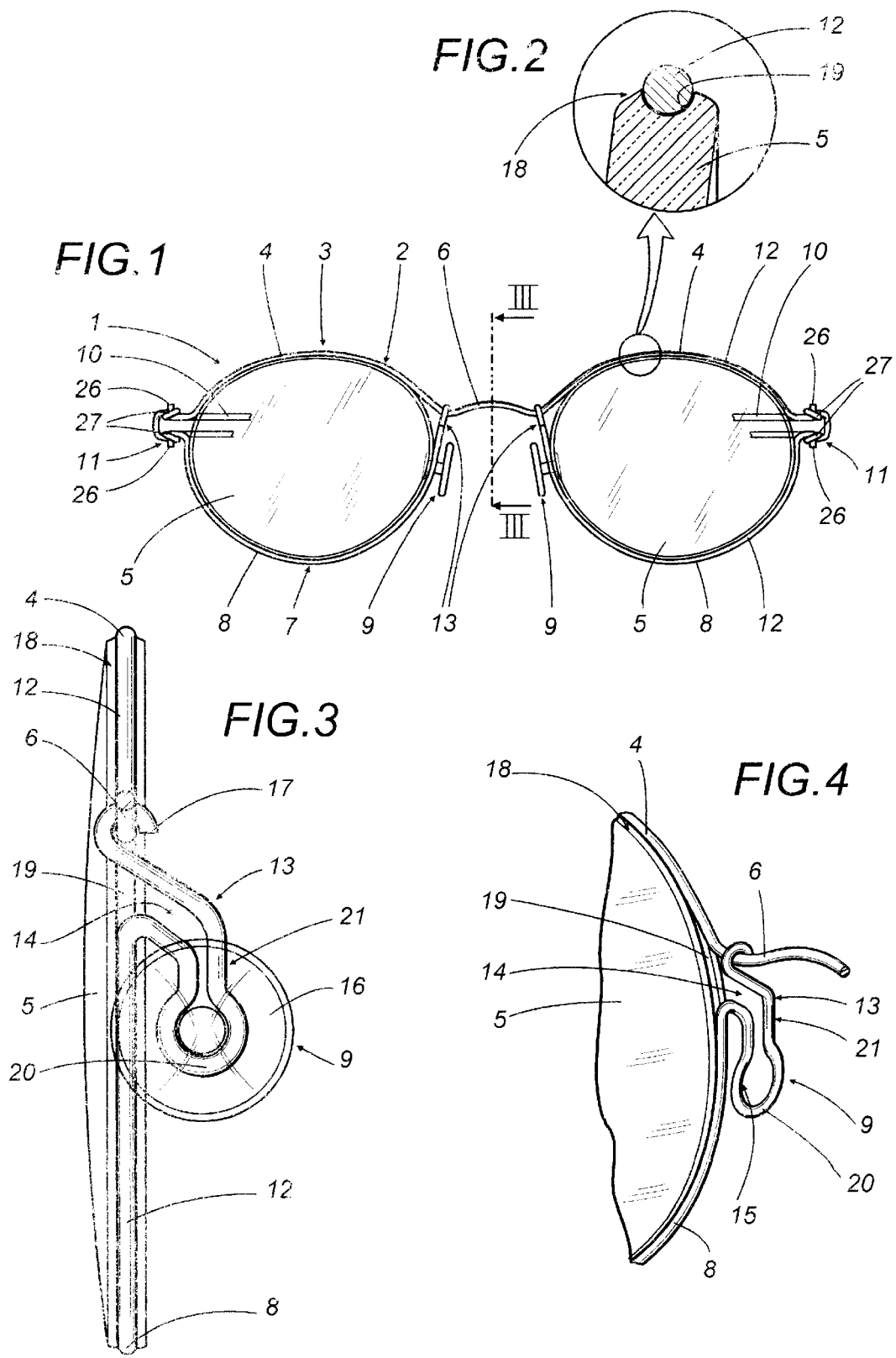

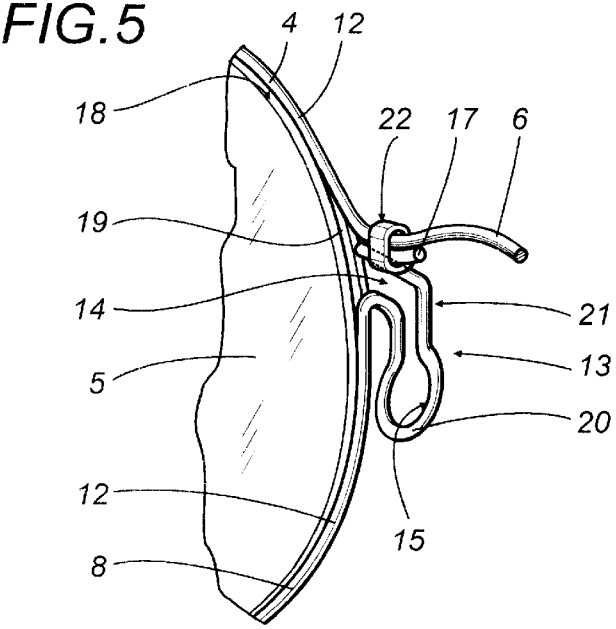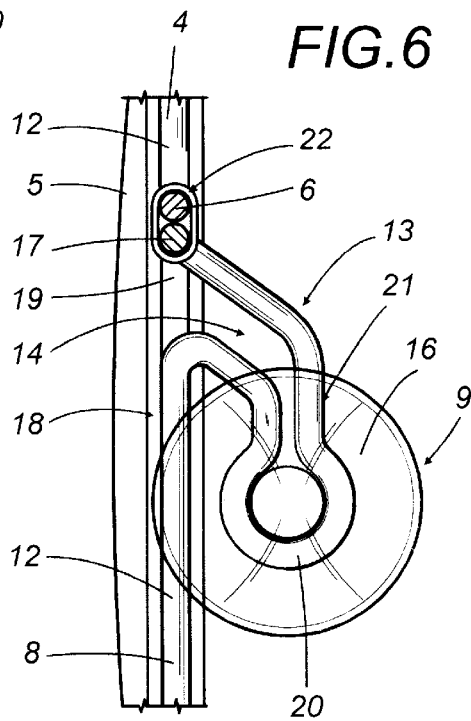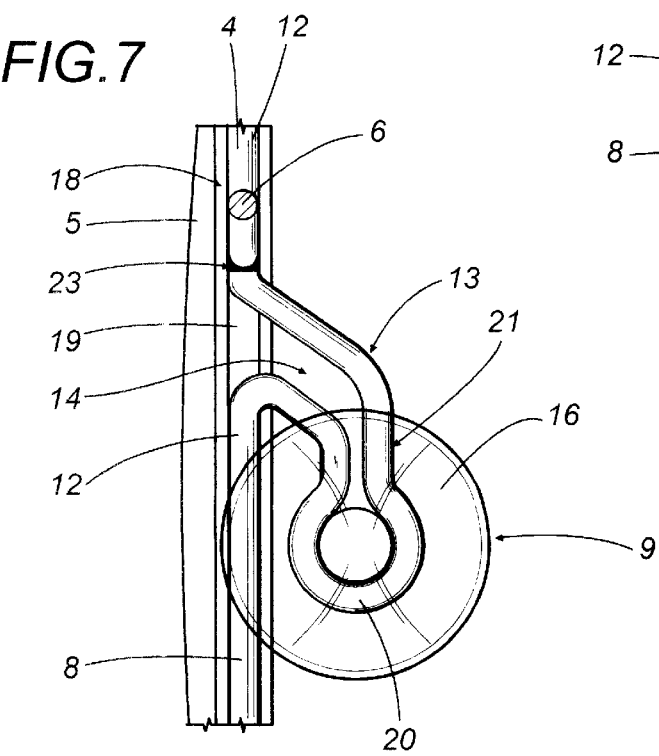

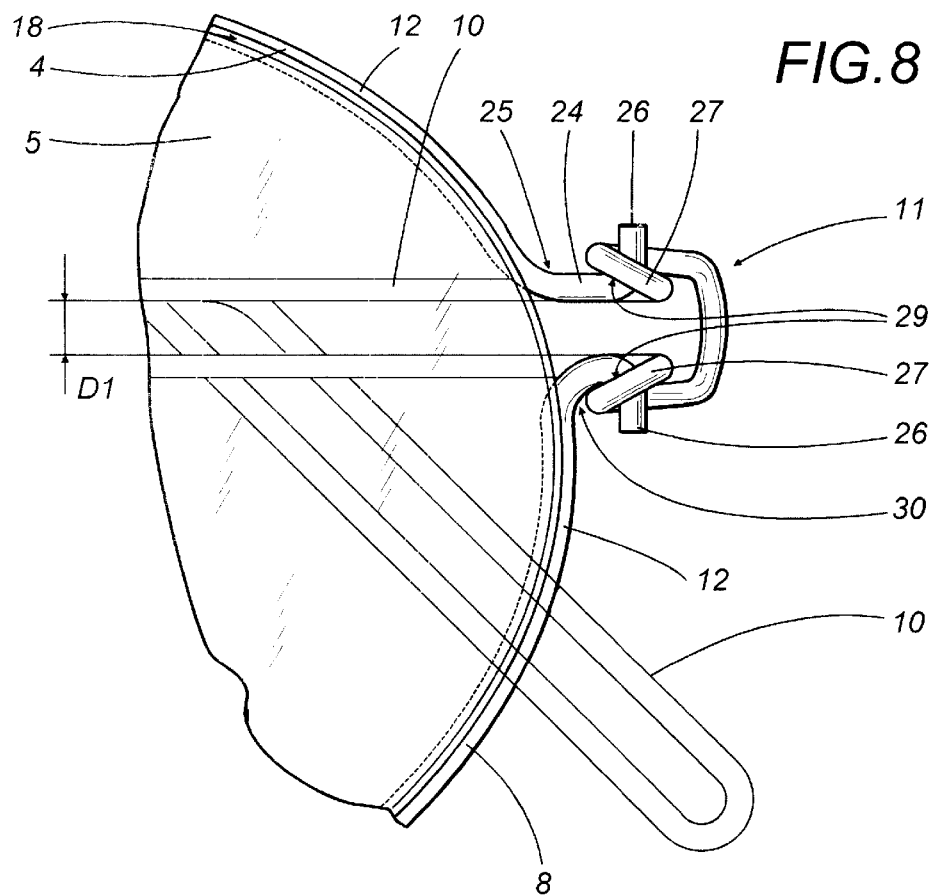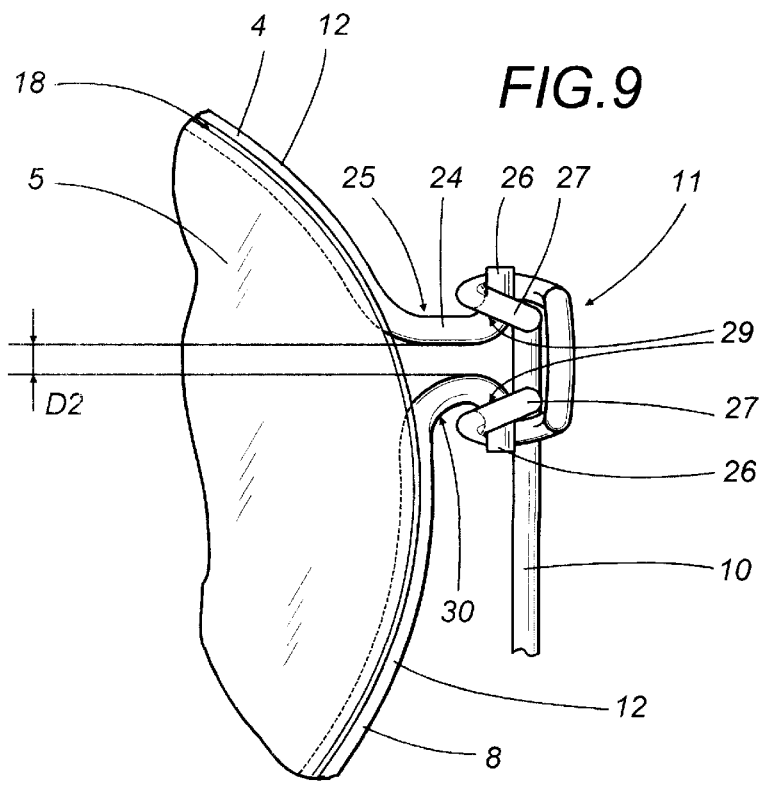

WIRE-FRAME SPECTACLES WITH ELASTICALLY AND TEMPORARILY DEFORMABLE LOOP PORTIONS

BACKGROUND OF THE INVENTION

The present invention relates to wire-frame, twin-lens spectacles, that is to say, binocular spectacles.

Conventional frames of this type, as described in the preamble to claim 1 at the end of the present description, have a first component part that consists of an upper portion that partly mounts the related lens and a bridge portion which is connected to the upper mounting portions. The frame also has a second component part consisting of a lower portion that partly mounts the related lens. Lastly, these types of frame have two sidepieces which are connected by a related hinge portion to the upper and lower partial mounting portions of each lens.

A wire frame of this kind is disclosed by patent publication U.S. Pat. No. 625,083 where the part of the frame without the sidepieces is made from a single wire. The two free ends of the single wire are permanently connected at the bridge by a ring.

In addition, patent publication U.S. Pat. No. 5,135,296 discloses spectacles with a frame made from a single wire and with a nose pad and where the two free ends of the single wire are looped in such a way as to accommodate the end part of a nose pad.

The two above mentioned known types of wire-frame spectacles have the disadvantage that positioning and fitting the lens in the frame is difficult and relatively complicated and may damage the edge of the lens on account of the relative rigidity of the lens mounting rims.

SUMMARY OF THE INVENTION

The aim of the present invention is to overcome the disadvantage just mentioned by providing wire-frame spectacles as described in the preamble to claim 1 below where the lenses can be quickly and safely positioned and fitted in the frame and can also be easily removed from the frame.

BRIEF DESCRIPTION OF THE DRAWINGS

The technical characteristics of the invention according to the above mentioned aim are described in the claims below and the advantages of the invention will become more apparent from the detailed description which follows, with reference to the accompanying drawings, which illustrate a preferred embodiment of the invention and in which:

FIG. 1 illustrates a first embodiment of the spectacles made in accordance with the present invention in a front view, with the sidepieces closed and with some parts cut away in order to better illustrate others.

FIG. 2 is a scaled up view of a detail of FIG. 1.

FIG. 3 is a side view through section III—III shown in FIG. 1.

FIG. 4 is a partial perspective view with reference to FIG. 3, with some parts cut away.

FIG. 5 is a perspective view, with some parts cut away, of a first constructional variant of a part of the spectacles made in accordance with the present invention.

FIG. 6 is a side view, partly in cross section, of the first variant illustrated in FIG. 5.

FIG. 7 is a side view, partly in cross section and with some parts cut away, of a second constructional variant of a part of the spectacles made in accordance with the present invention.

FIG. 8 is a scaled up view of a detail of FIG. 1, with some parts cut away and with the sidepieces closed.

FIG. 9 is a front view of a detail of FIG. 8 but with the sidepieces open.

DESCRIPTION OF THE PREFERRED EMBODIMENTS

Figure 10:
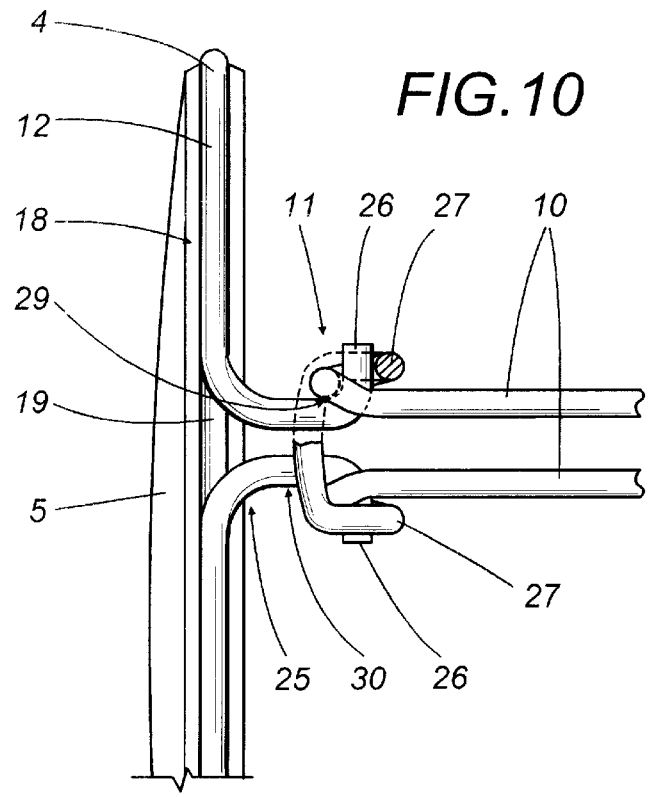
FIG. 10 is a side view of the detail shown in FIG. 9.

With reference to the accompanying drawings, FIGS. 1–4 illustrate spectacles, labeled 1 as a whole, with a wire frame 2 that mounts two lenses 5.

The frame 2 has a mounting structure consisting of a first component part, labeled 3 as a whole, having an upper portion 4 that partly mounts the related lens 5 and a bridge portion 6 connected to the upper mounting portions 4. A second component part 7 of the frame 2 has a lower portion 8 that partly mounts the related lens 5 and also a related loop 13. In this case, as shown in the illustrations, the loop 13 has both the form and function of a nose pad 9. The frame 2 also has two sidepieces 10 which are connected by a related hinge portion 11 to the upper 4 and lower 8 partial mounting portions of the two lenses 5.

As shown in FIG. 2, the wire 12 is circular in section and is thinner than the lens 5 which has a groove 19 running round its edge 18 and acting as a guide and seating for the wire 12.

According to the present invention, the nose pad 9 is made from the part of the wire 12 that extends from the lower mounting portion 8 towards the bridge 6 in such a way as to form the loop 13. The loop 13 has an opening 14 facing the bridge 6 in such a way that the loop 13 opens elastically at the opening 14. The elastic property of the loop 13 makes it much easier to exactly and safely fit and position the lens 5.

In particular, as shown more clearly in FIGS. 3 and 4, the loop 13 has a circular part 20 designed to form a seat 15 open towards the bridge 6. The seat 15 is used to attach a disc-shaped nose pad element 16, made preferably of plastic. The nose pad element 16 is a customary type nose pad and therefore not described in detail here.

The loop 13 also has an extension 21 that connects the circular part 20 with the related lower mounting portion 8 on one side and with the bridge 6 on the other side.

Each of the two loops 13 is elastically deformable at the opening 14 so that it can elastically increase the distance between the upper portion 4 and the lower portion 8 that mount the lens 5.

In the first embodiment of the invention (FIGS. 1–4), the frame 2 without the sidepieces 10 consists of three separate wires. The first separate wire forms the first component part 3 of the frame, that is to say, the two upper partial mounting portions 4 of the lens 5 and the bridge 6, while the second and third separate wires each form one of the two lower mounting portions 8 and one of the two nose pads 9. The free end 17 of the wire 12 of each nose pad 9 is permanently connected to the bridge 6, preferably through a crossways hooking (FIGS. 3 and 4).

Alternatively, the free end 17 of the wire 12 is connected to the bridge 6 by a ring 22 which permanently fixes two overlapping wire ends, as shown in FIGS. 5 and 6.

According to a third variant, the free ends 17 of the wire 12 are permanently connected to the bridge 6 by a butt weld 23 of the free ends 17 on the bridge 6 (FIG. 7).

Figure 12:
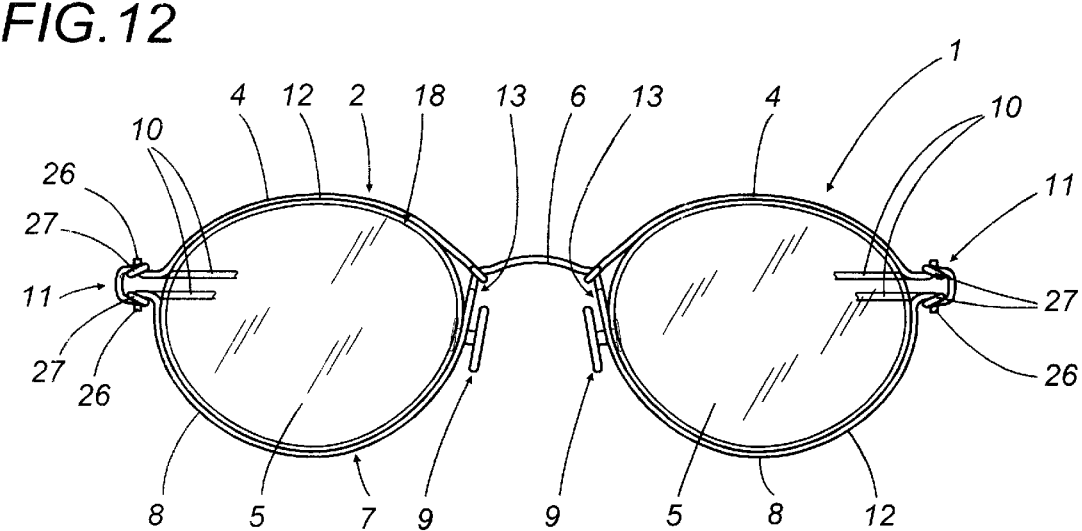
FIG. 12 is a front view of a fourth constructional variant of the spectacles made in accordance with the present invention.
Figure 13:
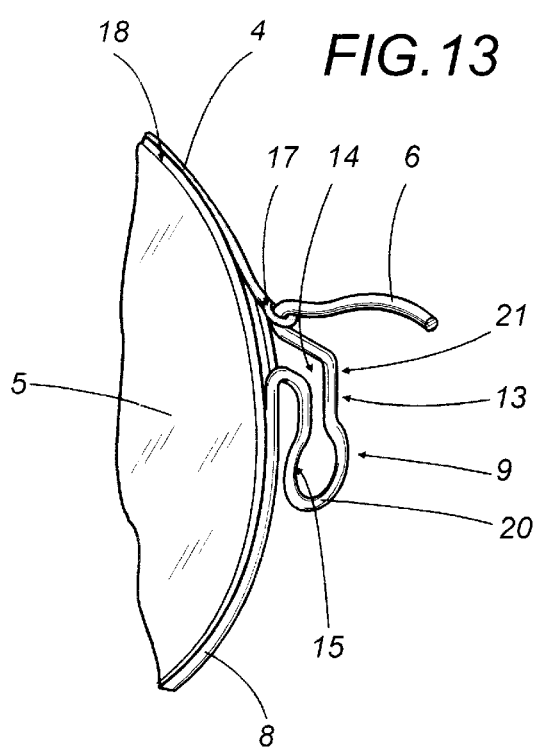
FIG. 13 is a partial perspective view with reference to FIG. 12 with some parts cut away.

FIGS. 12 and 13 illustrate another embodiment of the frame 2 made according to the present invention. In this case, too, the frame 2 without the sidepieces 10, is made from three separate wires, one of which forms the second component part 7, that is to say, the two lower partial mounting portions 8 of the lens 5, including the two nose pads, and the bridge 6. The permanent connection of the upper mounting portions 4 to the bridge 6 is made preferably by transversely hooking the free end 17 of the wire 12 of the corresponding upper mounting portion 4, as shown in FIG. 13.

As an alternative to the solution shown in FIG. 13, even the above mentioned second and third variants of the frame 2, that is, the use of the ring 22 (FIGS. 5 and 6) or the application of a weld, for example, a butt weld (FIG. 7) may be envisaged in the embodiment shown in FIG. 12 but are not illustrated as specifically applied to this embodiment.

The embodiment illustrated in FIGS. 12 and 13 lends itself well to making the bridge 6 and the two loops 13 or, alternatively, the two nose pads 9, from a single wire 12 that, considering the special function performed by these parts of the wire frame 2, is thicker than the wire used to make the two upper mounting portions 4 of the lenses 5.

As illustrated in FIGS. 8–10, the hinge portions 11 of the frame 2 preferably have an extension 25. This extension consists of two wires 12 belonging to the first component part 3 and to the second component part 7. The two wires 12 extend from the first and second component parts 3 and 7, in parallel and spaced apart, along a linear section 24 towards the hinge portion of the sidepiece 10 and away from the lens 5.

In one embodiment of the hinge portion 11 (FIGS. 1, 8, 9, 10, 12), the wires 12 end in the extension 25 with a hook-shaped free end 26. As shown in FIG. 8, for example, the hook-shaped ends 26 indicate opposite and diverging directions, so that the wires 12 can be moved closer together elastically at the extension 25 by a working force applied through the hinge portion 11 by an opening movement that moves the sidepiece 10 away from the lens 5.

In particular, according to the present invention, the hinge portion 11 of each sidepiece 10 has two windings 27, opposite each other and spaced apart. The windings 27 are made preferably from another separate wire 12 from the relative sidepiece 10.

Each of the two opposite hook-shaped free ends 26 of the component parts 3 and 8 is inserted into a corresponding central, through opening in the windings 27. Since the sidepiece 10 must be able to turn about an axis (not illustrated) the openings of the two opposite windings 27 are preferably coaxial and have a diameter to match the thickness of the wire 12 to be inserted into them.

In a preferred embodiment, the windings 27 of the wire 12 are helical with a single turn and a central opening into which a corresponding hook-shaped free end 26 can be easily inserted.

As shown in FIGS. 8, 9 and 10, each winding 27 has a working edge 29 acting on the outer edge 30 of the wire 12 along the linear section 24. The working distance between the opposite working edges 29, indicated by the variable "D" in FIGS. 8, 9 and 10, varies between two limits D1 and D2 according to how open the sidepiece 10 is in relation to the lenses 5.

FIG. 8 illustrates the hinge portion 11 with the sidepiece 10 in the closed position, that is, close to the lenses 5. In this position, the wires 12 along the linear section 24 are at a first distance D1 from each other, which is the greatest possible distance allowed by the windings 27.

FIG. 9, instead, illustrates the hinge portion 11 with the sidepiece 10 in the open position, that is, away from the lenses 5. In this position, the wires 12 along the linear section 24 are at a second distance D2 from each other, which is less than the above mentioned distance D1. The lessening of the working distance "D", for example, to the lower limit value D2, exerts a pressure on the corresponding wire 12 of the upper 4 and lower 8 partial mounting portions of the lens 5.

Thanks to the present invention, the pressure on the wire 12 is elastically compensated at least in part by a corresponding expansion or elastic deformation of the related loop 13.

In all the embodiments described above, the first component part 3 and the second component part 7 are together made from three separate wires which may be identical or different in thickness.

Figure 11:
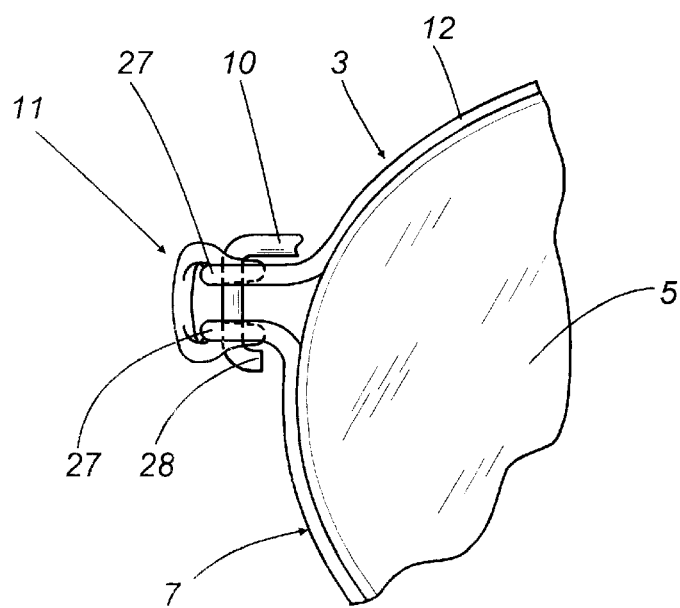
FIG. 11 is a front view of a third constructional variant of the spectacles made in accordance with the present invention.

In yet another embodiment of the present invention, the first component part 3 and the second component part 7 of the frame 2 are made from a single wire. In this case, the hinge portion 11 may be made, for example, as illustrated in FIG. 11. This single wire solution envisages that the hinge portion 11 of the component parts 3 and 7 have at least one winding 27, in this case, two opposite windings 27, spaced apart and made as shown in FIG. 8. In this single wire embodiment of the frame 2, without sidepieces 10, the hinge portion 11 belonging to the sidepiece 10 must necessarily have a portion of wire 12 with a hook-shaped free end 28. As shown in FIG. 11, the hook-shaped free end 28 of the sidepiece 10 is permanently inserted in such a way that it can axially rotate into the central, through openings of the two opposite windings 27 to enable the sidepiece 10 to turn from a closed position to an open position.

According to the above mentioned single wire embodiment of the frame 2, the two free ends 17 of the single wire 12 are located in the part between the loop 13 and the bridge 6, as shown in FIGS. 1 to 7. Consequently, even in this single wire embodiment, the end of the wire 12 can be connected to the bridge 6 by a suitable crossways hooking, as shown in FIG. 4, by a securing ring 22, as shown in FIG. 5 or by a butt weld 23, as shown in FIG. 7.

The figures illustrate different embodiments of wire frame spectacles with nose pad 9. The present invention, however, can also be used to make wire frame spectacles with loop 13 but without nose pads. Therefore, all kinds of wire frame spectacles, with or without nose pads, can be equipped with a loop according to the present invention, where each of the loops 13 must be elastically deformable in such a way that it can elastically and temporarily vary the amplitude of the area enclosed by the mounting perimeter of the frame 2 relative to the corresponding edge 18 of the lens 5.

Figure 14:
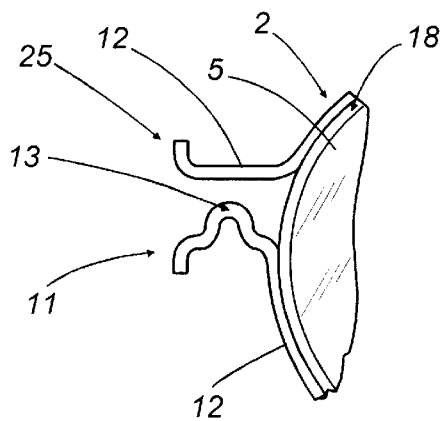
FIG. 14 is a front view, with some parts cut away, of a fifth constructional variant of the spectacles made in accordance with the present invention.

In fact, with reference to yet another embodiment, illustrated in FIG. 14, the frame 2 made according to the present invention has a loop 13 made in each hinge portion 11. Therefore, this embodiment could also be used to make spectacles without nose pads. As shown in FIG. 14, each hinge portion 11 has a single loop 13 open towards the outside, that is to say, extending towards the wire 12 opposite the extension 25 relative to the loop 13. The loop 13 could, however, be open towards the inside of the hinge portion 11.

The advantage of this embodiment is that the loop 13 can elastically and temporarily vary the amplitude of the area enclosed by the mounting perimeter of the frame 2 relative to the corresponding edge 18 of the lens 5 but without negatively affecting the construction or the operation of the hinge.

Such a negative effect might, for example, be caused, by spectacles with hinges that have an extension. If the spectacle frame does not have these loops, the above mentioned variation in the amplitude of the area enclosed by the mounting perimeter of the frame 2 might easily cause undesired plastic deformation of at least a part of the hinge. The presence of at least one loop in the hinge portion, according to the present invention, as illustrated in FIG. 14, for example, avoids this disadvantage since it elastically deforms the loop and thus prevents the hinge from being plastically deformed.

The wire 12 of the frame 2 is made at least partly of metal, in this case a metal alloy, preferably titanium, thanks to its good elastic "memory", that is to say, the ability of the material to elastically return to its original geometrical shape after being deformed.

Spectacles with a wire frame made according to the present invention and as illustrated in the accompanying drawings, that is, a frame with two loops that are elastically deformable at the opening and designed to elastically increase the relative distance between the upper portion and the lower portion have the advantage of allowing the lens to be fitted and positioned quickly, easily and safely.

Moreover, according to the present invention, the loops 13 need not be restricted to the area of the nose pad 9 and the structure that mounts the two lenses 5 may have at least one loop 13 anywhere along the perimeter of the frame around the lenses 5, as, for example, in the area of the hinge of the mounting structure (not illustrated). Whatever its location, each loop 13 must be elastically deformable in such a way that it can elastically increase the mounting perimeter of the frame 2 relative to the corresponding edge 18 of the lens 5.

The desired elastic effect of the frame made according to the present invention reduces the risk of damaging the lens, especially the profiled edge of the lens by incorrectly fitting it to the frame. This also applies when the lens is removed from the frame. Moreover, the sure and automatic positioning of the lens in the frame greatly reduces the risk of the lens accidentally falling out of the frame.

In the case of wire frame spectacles with nose pads, the presence of the loop according to the present invention also guarantees easy, quick and safe fitting of the nose pad in the related circular seat 15 formed by the loop 13.

Yet another advantage provided by the present invention is that once the nose pad elements have been placed on the nose pads made on the frame they cannot be lost because the edge of the lens mounted in the frame is immediately in front of the opening in the loop, thus preventing the nose pad element from falling out of the loop.

Therefore, the presence and special shape of the loops according to the present invention notably facilitates the fitting of the lenses and, when necessary, of the nose pads, without affecting the structural simplicity of the frame design.

The wire frame with two loops made according to the present invention also has the advantage of easily adjusting to the lens thanks to its elasticity. This feature is particularly important for spectacles of this kind which, because of their light weight structure, tend to lose their shape on account of plastic deformation after a time.

What is claimed:

1. Spectacles comprising:
   a wire frame for mounting two associated lenses, said frame including a mounting structure for the associated lenses and two sidepieces connected to the mounting structure by respective hinge portions, said mounting structure defining two mounting perimeters adapted for respective receipt of the two associated lenses and defining loops connected to and associated with the mounting perimeters, respectively, wherein each loop is elastically deformable in such a way that it elastically and temporarily varies, in terms of size, an area enclosed by the associated mounting perimeter of the frame.

2. The spectacles according to claim 1 wherein the frame comprises:
   a first component part including first and second upper portions adapted for partly mounting the associated lenses, respectively;
   a bridge portion interconnecting the first and second upper mounting portions; and,
   a second component part including first and second lower portions adapted for partly mounting the associated lenses, respectively, wherein the two sidepieces are connected by said hinge portions to the first upper and lower partial mounting portions and the second upper and lower partial mounting portions, respectively, said frame defining first and second loops made from a part of the wire frame that extends from the first and second lower mounting portions toward the bridge, respectively, in such a way that each of said first and second loops has an opening facing the bridge so that the first and second loops open elastically at the opening and elastically increase the distance between the first upper and lower mounting portions and the second upper and lower mounting portions, respectively.

3. The spectacles according to claim 2 wherein said first and second loops each define a nose pad.

4. The spectacles according to claim 3 wherein each of the first and second loops has a circular part designed to form a seat which is open toward the bridge, said spectacles further comprising:
   a nose pad element fitted in said circular part of each of said first and second loops, each of said loops also including an extension that connects the circular part with the related lower mounting portion on one side and with the bridge on the other side.

5. The spectacles according to claim 3 wherein the first component part is made from a single wire and wherein the wire frame portion forming each of the first and second loops has a free end that is connected to the bridge.

6. The spectacles according to claim 3 wherein the second component part and the bridge are made from a single wire and wherein a free end of the wire forming each of the first and second upper mounting portions is connected to the bridge.

7. The spectacles according to claim 3 wherein the first component part and the second component part of the frame are made from a single wire, wherein each of said hinge portions comprises at least one winding defining a central, through opening, wherein the sidepieces each comprise a hook-shaped portion adapted for insertion into the central, through opening in the winding of a respective one of said hinge portions.

8. The spectacles according to claim 2 wherein the first component part is made from a single wire and wherein the wire frame portion forming each of the first and second loops has a free end that is connected to the bridge.

9. The spectacles according to claim 8 wherein the wire free end of each of said first and second loops is permanently connected to the bridge by hooking the free ends crossways around the bridge.

10. The spectacles according to claim 8 further comprising:
   first and second locking rings permanently connecting the free ends of the wire forming said first and second loops to the bridge.

11. The spectacles according to claim 8 wherein the wire free end of each of said first and second loops is permanently connected to the bridge by a butt weld.

12. The spectacles according to claim 2 wherein the second component part and the bridge are made from a single wire and wherein a free end of the wire forming each of the first and second upper mounting portions is connected to the bridge.

13. The spectacles according to claim 12 wherein the wire free end of each of said first and second loops is permanently connected to the bridge by hooking the free ends crossways around the bridge.

14. The spectacles according to claim 12 further comprising:
   first and second locking rings permanently connecting the free ends of the wire forming said first and second loops to the bridge.

15. The spectacles according to claim 12 wherein the wire free end of each of said first and second loops is permanently connected to the bridge by a butt weld.

16. The spectacles according to claim 2 wherein the hinge portions of the frame each comprise an extension of two wires projecting outwardly respectively from the first component part and the second component part, wherein the two wires of each hinge run in parallel spaced apart relation along a linear section away from said bridge portion of said frame.

17. The spectacles according to claim 16 wherein the two wires of each hinge each have a hook-shaped free end, and wherein the linear sections of each hinge can be moved closer together elastically by a working force applied through the hinge portion when the sidepiece connected to the hinge portion is opened.

18. The spectacles according to claim 17 wherein each sidepiece defines two windings arranged opposite each other and spaced apart, wherein the hook-shaped free ends of each hinge are adapted for insertion into a central, through opening in the windings, respectively, said windings each including a working edge acting on an outer edge of the wire along the linear section of the respective hinge, wherein a working distance between opposite working edges of two windings varies between two limits as the sidepiece moves in relation to the hinge portion.

19. The spectacles according to claim 18 wherein each winding is helical and has a single turn.

20. The spectacles according to claim 17 wherein the first and second component parts of the frame are, together, made from three separate wire elements that have an equal thickness.

21. The spectacles according to claim 17 wherein the first and second component parts of the frame are, together, made from three separate wire elements, wherein at least two of said three separate wire elements differ in thickness.

22. The spectacles according to claim 2 wherein the first component part and the second component part of the frame are made from a single wire, wherein each of said hinge portions comprises at least one winding defining a central, through opening, wherein the sidepieces each comprise a hook-shaped portion adapted for insertion into the central, through opening in the winding of a respective one of said hinge portions.

23. The spectacles according to claim 1 wherein the wire from which the frame is defined comprises at least one of metal, metal alloy, and titanium.

24. The spectacles according to claim 1 wherein the wire is circular in section and is thinner than the associated lenses, whereby said wire is adapted for receipt in a groove running around an edge of each associated lens.

25. The spectacles according to claim 1 wherein the first and second loops are located at the hinge portions, respectively.

* * * * *